(12) United States Patent
Peet et al.

(10) Patent No.: US 10,472,293 B2
(45) Date of Patent: Nov. 12, 2019

(54) BUILDING ASSEMBLY CONTAINING A WATER BARRIER COATING FILM AND METHOD OF MAKING THE BUILDING ASSEMBLY

(71) Applicant: CERTAINTEED GYPSUM, INC., Malvern, PA (US)

(72) Inventors: Jeffrey H. Peet, Southborough, MA (US); Michael J. Lemberger, Dudley, MA (US); Natacha Huynh, Vitry-sur-seine (FR); Nicole Love, Franklin, MA (US)

(73) Assignee: CERTAINTEED GYPSUM, INC., Malvern, PA (US)

( * ) Notice: Subject to any disclaimer, the term of this patent is extended or adjusted under 35 U.S.C. 154(b) by 59 days.

(21) Appl. No.: 15/497,853

(22) Filed: Apr. 26, 2017

(65) Prior Publication Data

US 2017/0313630 A1 Nov. 2, 2017

Related U.S. Application Data

(60) Provisional application No. 62/329,610, filed on Apr. 29, 2016.

(51) Int. Cl.
*C04B 41/48* (2006.01)
*C09D 5/00* (2006.01)
(Continued)

(52) U.S. Cl.
CPC .......... *C04B 41/4869* (2013.01); *C09D 5/00* (2013.01); *C09D 7/61* (2018.01); *C09D 7/70* (2018.01);
(Continued)

(58) Field of Classification Search
CPC .......... C04B 41/4869; C09D 7/61; C09D 7/70
See application file for complete search history.

(56) References Cited

U.S. PATENT DOCUMENTS

| 3,505,169 A | * | 4/1970 | Parker | C08L 75/04 106/287.23 |
| 3,579,372 A | * | 5/1971 | Healy | D06N 3/14 28/169 |

(Continued)

FOREIGN PATENT DOCUMENTS

| CA | 2070489 A1 | 12/1993 |
| CA | 2887088 A1 | 4/2014 |

(Continued)

OTHER PUBLICATIONS

International Search Report for PCT/US217/29640, dated Aug. 1, 2017, 4 pages.

*Primary Examiner* — Victor S Chang
(74) *Attorney, Agent, or Firm* — Abel Schillinger, LLP; Thomas H. Osborn (57) ABSTRACT

A building assembly can include a substrate and a water barrier coating film. The water barrier coating film can include a thermoplastic polymer and microporous particles, such as microporous glass beads. The water barrier coating film can provide a good protection towards liquid water but may allow water vapor flow from the substrate through the coating film. The water vapor permeability of the water barrier coating film can be at least 2 US perms as tested according to ASTM E96 (2014) at 21° C. and 50% average relative humidity.

19 Claims, 5 Drawing Sheets

(51) Int. Cl.

| | | |
|---|---|---|
| *C09D 123/08* | (2006.01) | |
| *C09D 131/04* | (2006.01) | |
| *C09D 7/61* | (2018.01) | |
| *C09J 131/04* | (2006.01) | |
| *C09D 7/40* | (2018.01) | |
| *E04C 2/04* | (2006.01) | |
| *C08K 7/28* | (2006.01) | |
| *C04B 111/27* | (2006.01) | |
| *C04B 111/00* | (2006.01) | |
| *C08K 7/24* | (2006.01) | |

(52) U.S. Cl.
CPC ..... *C09D 123/0853* (2013.01); *C09D 131/04* (2013.01); *C09J 131/04* (2013.01); *E04C 2/043* (2013.01); *C04B 2111/00267* (2013.01); *C04B 2111/27* (2013.01); *C08K 7/24* (2013.01); *C08K 7/28* (2013.01)

(56) References Cited

U.S. PATENT DOCUMENTS

| | | | |
|---|---|---|---|
| 5,112,393 | A | 5/1992 | Engel et al. |
| 5,314,530 | A | 5/1994 | Wierer et al. |
| 6,355,317 | B1 | 3/2002 | Reid et al. |
| 6,524,679 | B2 | 2/2003 | Hauber et al. |
| 6,713,548 | B1 | 3/2004 | Zhang et al. |
| 6,866,492 | B2 | 3/2005 | Hauber et al. |
| 6,868,643 | B1 | 3/2005 | Williams et al. |
| 6,878,321 | B2 | 4/2005 | Hauber et al. |
| 7,317,051 | B2 | 1/2008 | Georgeau et al. |
| 7,435,369 | B2 | 10/2008 | Hennis et al. |
| 7,491,426 | B1 | 2/2009 | Rooshenhas |
| 7,553,780 | B2 | 6/2009 | Smith |
| 7,615,254 | B2 | 11/2009 | Smith |
| 7,662,221 | B2 | 2/2010 | Fay |
| 7,670,415 | B1 | 3/2010 | Rosenberg et al. |
| 7,811,413 | B2 | 10/2010 | Hennis et al. |
| 7,825,171 | B2 | 11/2010 | Copeland |
| 7,998,530 | B2 | 8/2011 | Batdorf |
| 8,092,858 | B2 | 1/2012 | Smith |
| 8,112,966 | B2 | 2/2012 | Hauber et al. |
| 8,202,919 | B2 | 6/2012 | Copeland |
| 8,409,391 | B2 | 4/2013 | Hauber et al. |
| 8,486,516 | B2 | 7/2013 | Hauber et al. |
| 8,513,328 | B2 | 8/2013 | Dorman |
| 8,524,822 | B2 | 9/2013 | Wiercinski |
| 8,557,909 | B2 | 10/2013 | Stuart et al. |
| 8,580,866 | B2 | 11/2013 | Nones et al. |
| 8,592,040 | B2 | 11/2013 | Hayes et al. |
| 8,748,528 | B2 | 6/2014 | Cao et al. |
| 9,096,036 | B2 | 8/2015 | Hauber et al. |
| 2003/0088221 | A1 | 5/2003 | Corzani et al. |
| 2003/0148092 | A1 | 8/2003 | Gross |
| 2004/0072487 | A1* | 4/2004 | Neumann ........... B28B 19/0092 442/76 |
| 2005/0196601 | A1 | 9/2005 | Fitzgerald et al. |
| 2005/0247021 | A1 | 11/2005 | Schauffele |
| 2007/0130867 | A1 | 4/2007 | Flaherty |
| 2007/0141304 | A1 | 6/2007 | Agrawal |
| 2007/0294976 | A1 | 12/2007 | Fay |
| 2008/0289279 | A1 | 11/2008 | Hannan et al. |
| 2011/0130062 | A1 | 6/2011 | Squires |
| 2011/0135879 | A1 | 6/2011 | Bennett et al. |
| 2011/0203218 | A1 | 8/2011 | Solov et al. |
| 2012/0039977 | A1 | 2/2012 | Dracopoulos et al. |
| 2013/0196070 | A1 | 8/2013 | Lefevre et al. |
| 2013/0327461 | A1 | 12/2013 | Hauber et al. |
| 2014/0196396 | A1 | 7/2014 | Watts et al. |
| 2014/0199529 | A1 | 7/2014 | Hoff |
| 2014/0261954 | A1 | 9/2014 | Subey et al. |
| 2014/0272404 | A1 | 9/2014 | Shake et al. |
| 2015/0064433 | A1 | 3/2015 | Foster et al. |
| 2015/0176211 | A1 | 6/2015 | Knapp et al. |
| 2015/0197034 | A1 | 7/2015 | Hauber et al. |
| 2015/0197938 | A1 | 7/2015 | Boydston et al. |
| 2015/0197941 | A1 | 7/2015 | Urso et al. |
| 2015/0267076 | A1 | 9/2015 | Bodkhe et al. |
| 2016/0000615 | A1* | 1/2016 | Larios ........... B32B 7/04 428/213 |

FOREIGN PATENT DOCUMENTS

| | | |
|---|---|---|
| CH | 584824 A5 | 2/1997 |
| CN | 101768400 A | 7/2010 |
| CN | 104177046 A | 12/2014 |
| CN | 104263224 A | 1/2015 |
| CN | 104919016 A | 9/2015 |
| EP | 0441297 B1 | 2/1991 |
| EP | 0850786 B1 | 3/2002 |
| EP | 1773924 A1 | 4/2007 |
| EP | 2010616 B1 | 1/2010 |
| JP | H0673327 A | 3/1994 |
| TW | 407180 B | 10/2000 |
| TW | I320446 B | 2/2010 |
| TW | I526593 B | 3/2016 |
| WO | 03078734 A1 | 9/2003 |
| WO | 2006009762 A1 | 1/2006 |
| WO | 2008119887 A1 | 10/2008 |
| WO | 2011139481 A1 | 1/2011 |
| WO | 2012097140 A2 | 7/2012 |
| WO | 2013164646 A1 | 11/2013 |
| WO | 2014055578 A2 | 4/2014 |
| WO | 2014143780 A1 | 9/2014 |
| WO | 2015126931 A1 | 8/2015 |
| WO | 2015158588 A1 | 10/2015 |

* cited by examiner

BUILDING ASSEMBLY CONTAINING A WATER BARRIER COATING FILM AND METHOD OF MAKING THE BUILDING ASSEMBLY

CROSS-REFERENCE TO RELATED APPLICATION(S)

This application claims priority under 35 U.S.C. § 119(e) to U.S. Provisional Patent Application No. 62/329,610, entitled "BUILDING SUBSTRATE WITH INTEGRATED WATER BARRIER COATING," by Jeffrey H. PEET et al., filed Apr. 29, 2017, which is assigned to the current assignee hereof and incorporated herein by reference in its entirety.

FIELD OF THE DISCLOSURE

The present disclosure relates to a building assembly containing a water barrier coating film and a method of making the building assembly.

BACKGROUND

Hotmelt coated gypsum boards for the tile-backer market are highly water resistive but have the disadvantage that water vapor cannot penetrate through the boards. It is desirable to develop a coated gypsum board which has both a high resistance to fluid water but allows water vapor penetration.

SUMMARY

According to one embodiment, a building assembly comprises a substrate and a water barrier coating film. The substrate comprises a first surface and a second surface opposite to the first surface, and the coating film overlies the first surface, the second surface, or the first surface and the second surface of the substrate. The coating film comprises a thermoplastic polymer and microporous particles; and the coating film has a water vapor permeability of at least 2 US perms as tested according to ASTM E96 (2014) at 21° C. and 50% average relative humidity.

According to another embodiment, a method for making a building assembly comprises: providing a substrate comprising a first surface and a second surface opposite to the first surface; preparing a water barrier coating film comprising a thermoplastic polymer and microporous particles; and applying the water barrier coating film on the first surface, the second surface, or the first surface and second surface of the substrate.

According to a further embodiment, a water barrier coating film comprises a thermoplastic polymer and microporous particles, the water barrier coating film having a water vapor permeability of at least 2 US perms as tested according to ASTM E96 (2014) at 21° C. and 50% average relative humidity.

BRIEF DESCRIPTION OF THE DRAWINGS

The present disclosure may be better understood, and its numerous features and advantages made apparent to those skilled in the art by referencing the accompanying drawings.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive- or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Various embodiments of the present disclosure will now be described, by way of example only, with reference to the accompanying drawings.

The present disclosure relates to a building assembly comprising a substrate that is protected by a water barrier coating film. The water barrier coating film includes at least one thermoplastic polymer and microporous particles, and can have a water vapor permeability (WVP) of at least 2 US perms.

As used herein, when referring to the WVP of the water barrier coating film, the cited WVP value is described in US perms and has been measured according to standard ASTM E96 (2014) at 21° C. and 50% relative humidity, unless indicated otherwise. 1 US perm converts to 0.659045 metric perms.

Figure 1:
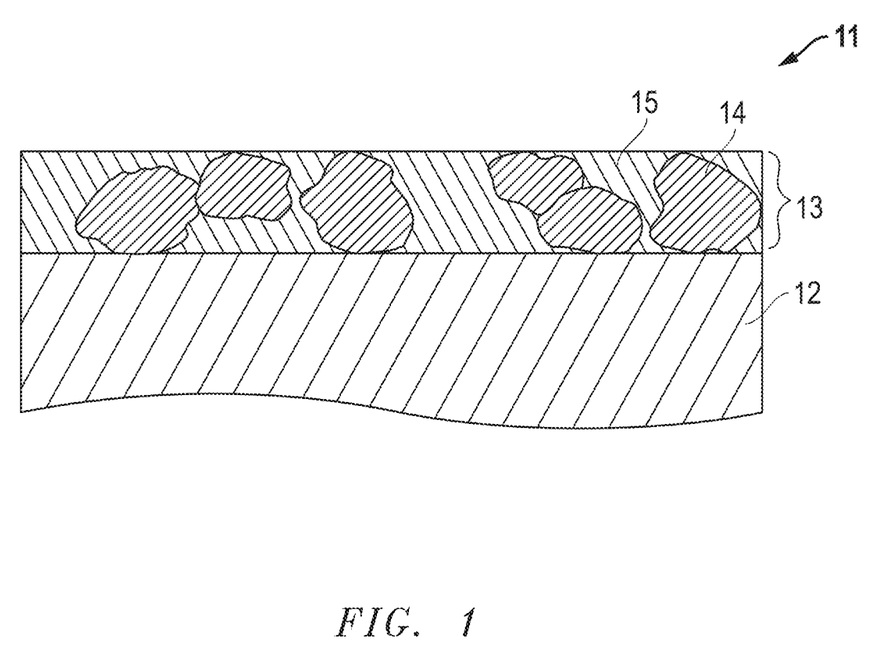
FIG. 1 includes an illustration of a building assembly containing a substrate and a water barrier coating film according to one embodiment.

In one embodiment, as illustrated in FIG. 1, the building assembly 11 can comprise a substrate 12 and a water barrier coating film 13. The water barrier coating film 13 may comprise a coating composition 15 and microporous particles 14 which are surrounded to a large extent by the coating composition. The microporous particles 14 can bridge a water vapor flow via an interconnected microporous structure (not shown) between the substrate 12 and the exterior air. The interconnected microporous structure throughout the coating film 13 can be provided by an arrangement of several microporous particles attached to one another, or by single microporous particles, wherein the size of a single microporous particle can reach across the thickness of the complete coating film 13.

Figure 2:
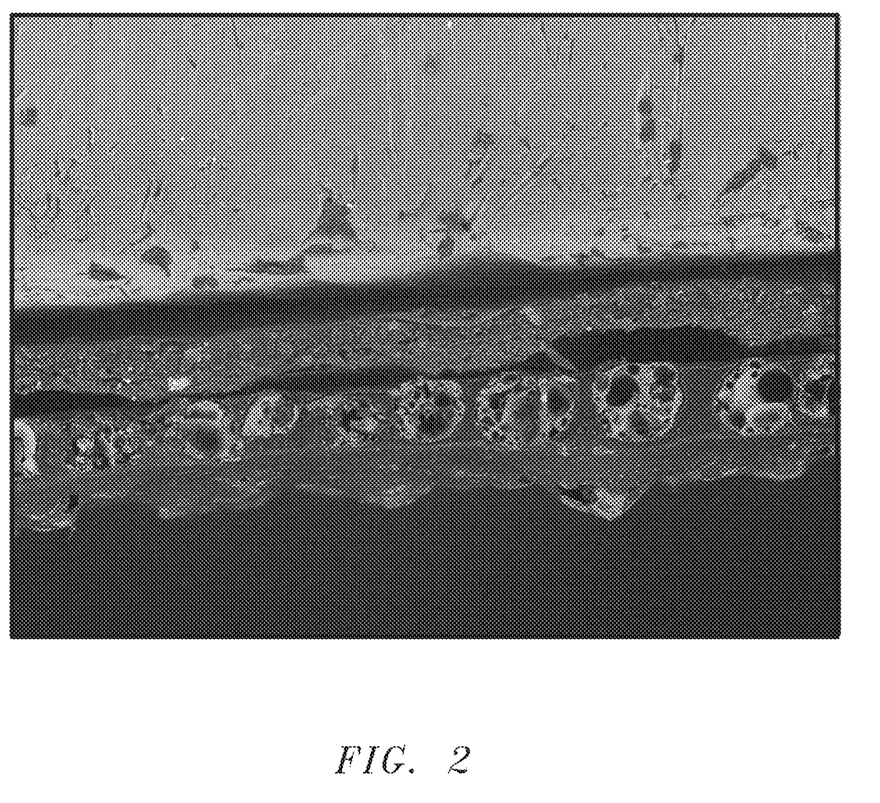
FIG. 2 includes a scanning electron microscope (SEM) image of a water barrier coating film according to one embodiment.

FIG. 2 shows an SEM image of a cross-cut of a water barrier coating film, produced according to the present disclosure. Porous glass beads can form a bridge throughout the coating film which may allow water vapor to penetrate through the coating film.

The substrate 12 can be any structure involved in the construction of buildings that would benefit from a coating film 13 that can protect against fluid water, but may be permeable for water vapor to a certain extent. A non-limiting example for building substrates can be a wall assembly, a board, a siding, a sheet good, or a panel. In a particular embodiment, the substrate 12 may be a board comprising gypsum.

The microporous particles 14 can comprise microporous glass beads, microporous ceramic beads, microporous polymer beads, beads formed from a naturally microporous material, or any combination thereof. In a particular embodiment, the microporous particles can consist essentially of microporous glass beads.

In certain embodiments, the microporous particles may have an average particle size of at least 25 µm, such as at least 40 µm, at least 50 µm, at least 70 µm, at least 100 µm, or at least 130 µm. In other embodiments, the microporous particles may be not greater than 1000 µm, such as not greater than 900 µm, not greater than 800 µm, not greater than 700 µm, not greater than 600 µm, or not greater than 500 µm. The average particle size of the microporous particles can be a value between any of the maximum and minimum values noted above, such as from 25 µm to 1000 µm, from 80 µm to 850 µm, or from 120 µm to 500 µm.

As used herein, when referring to the average microporous particle size, the recited values refer to the D50 values of the particle distribution.

The average particle size of the microporous particles can be further defined by the ratio of the average particles size to the maximum thickness of the coating film. In embodiments, a ratio of the average microporous particles size to the maximum thickness of the coating film can be at least 0.1 to 1, at least 0.2 to 1, or at least 0.3 to 1. In other embodiments, the ratio of the average microporous particles size to the total thickness of the coating film may be not greater than 1 to 1, such as not greater than 0.9 to 1, or not greater than 0.8 to 1.

In embodiments, the thickness of the water barrier coating film of the present disclosure can be at least 25 µm, such as at least 30 µm, at least 40 µm, or at least 50 µm. In other embodiments, the thickness of the coating film may be not greater than 1000 µm, such as not greater than 900 µm, not greater than 800 µm, or not greater than 700 µm. The thickness of the water barrier coating film can be a value within any of the maximum and minimum values noted above, such as from 25 µm to 1000 µm, from 50 µm to 900 µm, or from 100 µm to 800 µm.

In further embodiments, the amount of the microporous particles in the coating film can be at least 1 vol %, such as at least 5 vol %, at least 10 vol %, or at least 15 vol % based on the total weight of the coating. In other embodiments, the amount of the microporous particles may be not greater than 60 vol %, such as not greater than 55 vol %, not greater than 50 vol %, not greater than 40 vol %, not greater than 35 vol %, or not greater than 30 vol % based on the total weight of the coating film. The amount of the microporous particles in the coating film can be a value between any of the maximum and minimum values noted above, such as from 1 vol % to 60 vol %, from 10 vol % to 50 vol %, or from 16 vol % to 35 vol % based on the total volume of the coating film.

In yet further embodiments, the microporous particles contained in the coating film of the present disclosure may have an average pore diameter of at least 30 nm, such as at least 50 nm, at least 70 nm, or at least 100 nm; in other embodiments, the average pore diameter may not be greater than 100 µm, such as not greater than 50 µm, not greater than 10 µm, or not greater than 1 µm. The average pore diameter of the microporous particles can be a value between any of the maximum and minimum values noted above, such as from 30 nm to 100 µm, from 50 nm to 50 µm, or from 100 nm to 1 µm.

In yet other embodiments, the microporous particles contained in the water barrier coating film of the present disclosure can have an average pore volume of at least 0.05 cm$^3$/g, such as at least 0.1 cm$^3$/g, at least 0.2 cm$^3$/g, at least 0.3 cm$^3$/g, or at least 0.5 cm$^3$/g. In other embodiments, the average pore volume may not greater than 2 cm$^3$/g, such as not greater than 1.5 cm$^3$/g, not greater than 1.0 cm$^3$/g, not greater than 0.9 cm$^3$/g, or not greater than 0.8 cm$^3$/g. The average pore volume of the microporous particles can be a value between any of the maximum and minimum values noted above, such as from 0.05 cm$^3$/g to 2.0 cm$^3$/g, from 0.2 cm$^3$/g to 0.9 cm$^3$/g, or from 0.3 cm$^3$/g to 0.8 cm$^3$/g.

In further embodiments, the microporous particles can have an aspect ratio of length to width of not greater than 5, such as not greater than 3, not greater than 2, or not greater than 1.5. In a particular embodiment, the microporous particles contained in the coating film can be spherical.

The at least one thermoplastic polymer of the water barrier coating film can include, for example, an ethylene vinyl acetate copolymer, a polyolefin, an ethylene methacrylate (EMA) copolymer, an ethylene acrylic acid copolymer (EAA), a styrene block copolymer, a polyurethane, a polyamide, or any combination thereof.

In certain embodiments, the amount of the thermoplastic polymer in the coating film can be at least 10 wt %, such as at least 20 wt %, or at least 30 wt %. In other embodiments, the amount of thermoplastic polymer may be not greater than 70 wt %, such as not greater than 60 wt %, not greater than 50 wt %, or not greater than 45 wt % based on the total weight of the coating. The amount of thermoplastic polymer in the coating film can be a value between any of the minimum and maximum values noted above, such as from 10 wt % to 70 wt %, from 15 wt % to 65 wt %, or from 20 wt % to 55 wt %.

In addition to the thermoplastic polymer, the water barrier coating film of the present disclosure can comprise a wax, a tackifying resin, or both.

Non-limiting examples of a suitable wax can be polar and non-polar polyethylene (PE) wax, polypropylene wax (PP), metallocene PE or PP wax, maleic anhydride grafted PE or PP wax, Montan wax, silane-modified PE wax, amide wax, ester wax, or PE/polytetrafluoroethylene (PTFE) wax, or any combination thereof.

The wax may be present in the water barrier coating film in an amount of at least 5 wt %, such as at least 7 wt %, at least 10 wt %, or at least 15 wt % based on the total weight of the coating film. In other aspects, the amount of wax in the coating film may be not greater than 40 wt %, such as not greater than 35 wt %, not greater than 30 wt %. The amount of wax in the coating film can be a value between any of the maximum and minimum values noted above, such as from 5 wt % to 40 wt %, from 8 wt % to 35 wt % or from 20 wt % to 30 wt % based on the total weight of the coating film.

With regard to the tackifying resin that may be present in the water barrier coating film, non-limiting examples of tackifying resin can be aliphatic resin, such as mixed monomers of petroleum origin, aromatic resin, such as mixtures of petroleum derived feed streams, pure monomer resin, hydrogenated pure monomer resin, hydrogenated aliphatic resin, or any combination thereof.

In embodiments, the amount of tackifying resin in the coating film can be at least 10 wt %, such as at least 15 wt %, at least 20 wt %, or at least 25 wt % based on the total weight of the coating film. In other embodiments, the amount of tackifying resin may be not greater than 50 wt %, such as not greater than 45 wt %, not greater than 40 wt %, or not greater than 35 wt %. The amount of tackifying resin in the coating film can be a value between any of the maximum and minimum values noted above, such as from 10 wt % to 50 wt %, from 15 wt % to 45 wt %, or from 20 wt % to 40 wt % based on the total weight of the coating film.

In one embodiment, the water barrier coating film can further comprise a cellulose ester, for example, cellulose acetate, cellulose propionate, cellulose butyrate, cellulose acetate propionate, cellulose acetate butyrate, cellulose propionate butyrate, or any combination thereof. In a particular embodiment, the cellulose ester can be cellulose acetate propionate.

In other embodiments the coating film can further include a UV absorber, a light stabilizer, a filler, a dye, a dispersant or any combination thereof.

The water barrier coating film of the present disclosure can allow to a certain extent water vapor flow from the substrate to the exterior air, but can protect the substrate from being reached from exterior liquid water. In embodiments, the water barrier coating film can have a water vapor permeability (WVP) of at least 2 US perms, such as at least 3 perms, at least 5 US perms, at least 7 US perms, at least 10 US perms, at least 15 US perms, at least 20 US perms, or at least 25 US perms. In further embodiments, the water barrier coating film of the present disclosure can have a WVP of not greater than 150 US perms, such as not greater than 100 US perms, not greater than 50 US perms, or not greater than 30 US perms. The WVP of the coating film can be a value between any of the maximum and minimum values noted above, such as from 2 US perms to 10 US perms, from 3 US perms to 120 US perms, from 5 US perms to 110 US perms, or from 10 US perms to 80 US perms.

In certain embodiments, the water barrier coating film can be a one-layer coating in direct contact with at least one surface layer of the building substrate. In further particular embodiments, the water barrier coating film may be also a multi-layer coating, for examples, a two-layer coating or a three-layer coating.

In a particular embodiment, the water barrier coating film can include at least one thermoplastic polymer in an amount of 20 wt % to 60 wt % based on the total weight of the coating film, a wax in an amount of 5 wt % to 40 wt % based on the total weight of the coating film; a tackifying resin in an amount of 15 wt % to 50 wt % based on the total weight of the coating film; and microporous particles in an amount of 16 vol % to 35 vol % based on the total volume of the coating film. Optionally, the coating film may further include a UV absorbent in an amount of 0.1 wt % to 3 wt % based on the total weight of the coating film.

In a particular embodiment, the water barrier coating film can be a hotmelt coating including embedded microporous particles.

The present disclosure is further directed to a method for making the above-described building assembly. The method can comprise: providing a substrate having a first surface and a second surface opposite to the first surface; preparing a water barrier coating film comprising a thermoplastic polymer and microporous particles; and applying the water barrier coating film on the first surface, the second surface, or the first and the second surface of the substrate.

In one embodiment, the water barrier coating film 13 can be prepared as follows: melting a coating composition, wherein the coating composition comprises a thermoplastic polymer; applying a layer of the melted coating composition onto a removable liner; adding microporous particles on top of the applied melted coating composition that a majority of the microporous particles is embedded into the melted coating composition; and allowing the melted coating composition to cool and to solidify to form the water barrier coating film 13, comprising microporous particles 14 embedded into a coating composition 15 (see FIG. 1). In particular embodiments, the melted coating composition can be adapted to solidify within a short time, such as less than 60 seconds, less than 45 seconds, less than 30 seconds, less than 20 seconds, or less than 15 seconds.

The adding of the microporous particles can be performed by spreading the microporous particles over the applied layer of the melted coating composition and by further pressing, e.g., with a heavy plate or a heavy roller, the microporous particles into the melted coating layer. The pressing of the microporous particles into the melted coating layer can be assisted by placing a removable liner on top of the spreaded microporous particles and underneath the applied weight. In a particular aspect, the liner can be a non-sticking polymeric film, e.g., a PTFE film.

Figure 3:
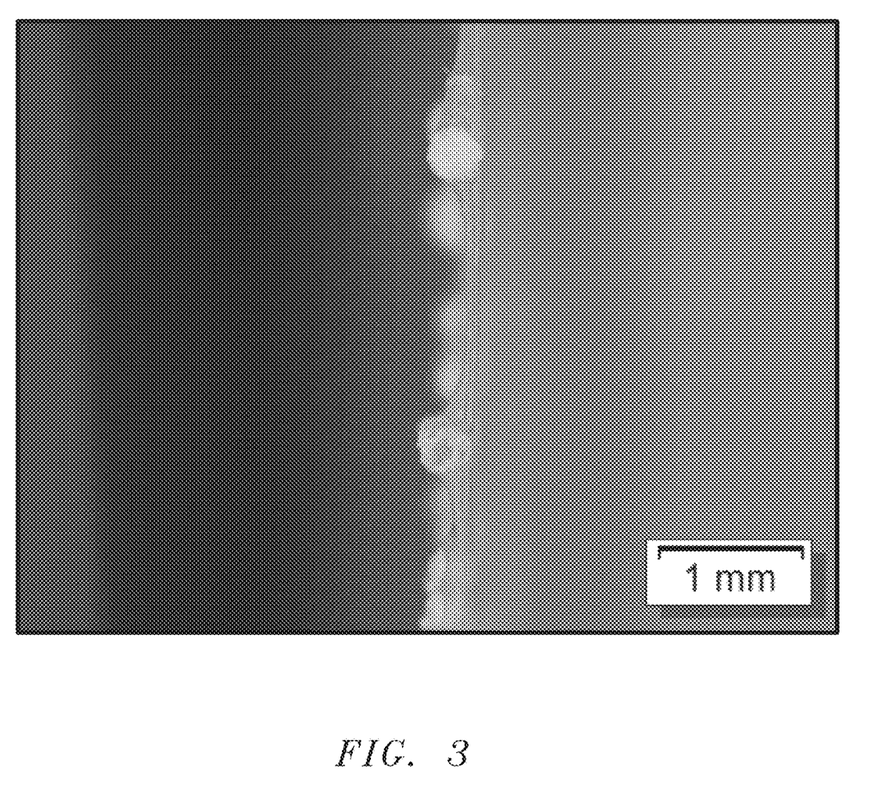
FIG. 3 includes an optical microscope image of a water barrier coating film according to another embodiment.

In certain embodiments, a ratio $T_p$ to $T_m$ can be equal or larger then 1:1, with $T_p$ being the average particle size of the microporous particles before adding to the layer of the melted coating composition, and $T_m$ being the thickness of the layer of the melted coating composition before adding of the microporous particles. In aspects, the ratio $T_p$ to $T_m$ can be from 1:1 to 3:1, from 1:1 to 2:1, from 1:1 to 1.7:1, from 1:1 to 1.5:1, or from 1.1:1 to 1.7:1. FIG. 3 illustrates an optical microscope image (made with an Olympus SZX-16) of a water barrier coating film wherein the microporous particles were larger then the thickness of the layer of the melted coating composition, which lead to a coating film with a rough and bumpy surface.

The water barrier coating film illustrated in FIG. 3 has a high total thickness variation (TTV), but is not limited thereto. In certain embodiments, the water barrier coating film can have a TTV of at least 1 micron, such as at least 2 microns, at least 5 microns, at least 10 microns, at least 20 microns, or at least 30 microns. In other aspects, the TTV of the water barrier coating film may be not greater than 300 microns, such as not greater than 250 microns, not greater than 200 microns, not greater than 150 microns, not greater than 100 microns, or not greater than 50 microns. The total thickness variation can be a value between any of the maximum and minimum values noted above, such as from 2 microns to 300 microns, from 5 microns to 150 microns, from 40 microns to 100 microns, or from 2 to 20 microns.

The water barrier coating film 13 can be applied to a surface of a substrate 12 by laminating. During laminating, the coating film is softened at elevated temperatures up to 110° C., but not melted, and adhered to the respective surface of the substrate. In a particular aspect, applying the water barrier coating film via laminating can be conducted when the substrate is a gypsum board.

In another embodiment, depending on the material of the substrate, the water barrier coating film may be also formed directly on a surface of a substrate. In this embodiment, the above-described procedure can be the same, except that the removable liner is a surface of the substrate.

It has been surprisingly discovered that by selecting microporous particles having a certain particle size and porosity in relation to the coating layer thickness and type of coating composition, a water barrier coating film can be obtained having a desired water vapor permeability and while being resistive to fluid water.

Building assemblies comprising the water barrier coating films of the present disclosure can be used, for example, as backing boards for tiles.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A building assembly comprising a substrate and a water barrier coating film, wherein the substrate comprises a first surface and a second surface opposite to the first surface, and the coating film overlies the first surface, the second surface, or the first surface and the second surface of the substrate; the coating film comprises a thermoplastic polymer and microporous particles; and the coating film has a water vapor permeability of at least 2 US perms as tested according to ASTM E96 (2014) at 21° C. and 50% average relative humidity.

Embodiment 2

The building assembly of embodiment 1, wherein the microporous particles comprise microporous glass beads, microporous ceramic beads, microporous polymer beads, a naturally microporous material, or any combination thereof.

Embodiment 3

The building board of embodiment 2, wherein the microporous particles are consisting essentially of microporous glass beads.

Embodiment 4

The building assembly of any of the preceding embodiments, wherein the microporous particles have an average particles size of at least 25 microns, such as at least 30 microns, at least 30 microns, at least 50 microns, at least 70 microns, or at least 100 microns.

Embodiment 5

The building assembly of any of the preceding embodiments, wherein the microporous particles have an average particles size of not greater than 1000 microns, such as not greater than 800 microns, not greater than 700 microns, or not greater than 500 microns.

Embodiment 6

The building assembly of any of the preceding embodiments, wherein the coating film has a thickness of at least 25 microns, such as at least 30 microns, at least 40 microns, at least 50 microns, or at least 100 microns.

Embodiment 7

The building assembly of any of the preceding embodiments, wherein the coating film has a thickness of not greater than 1000 microns, such as not greater than 900 microns, not greater than 800 microns, not greater than 700 microns, not greater than 500 microns, not greater than 300 microns, or not greater than 200 microns.

Embodiment 8

The building assembly of any of the preceding embodiments, wherein a ratio of an average size of the microporous particles to an average thickness of the coating film ranges from 0.1:1 to 1:1.

Embodiment 9

The building assembly of any of the preceding embodiments, wherein an amount of the microporous particles in the coating film is at least 1 vol %, such as at least 5 vol %, at least 10 vol %, or at least 15 vol % based on the total volume of the coating film.

Embodiment 10

The building assembly of any of the preceding embodiments, wherein an amount of the microporous particles in the coating film is not greater than 60 vol %, such as not greater than 55 vol %, not greater than 50 vol %, not greater than 40 vol %, not greater than 35 vol %, not greater than 30 wt %, or not greater than 25 wt %, based on the total volume of the coating film.

Embodiment 11

The building assembly of any of the preceding embodiments, wherein the microporous particles have an average pore diameter of at least 50 nm, such as at least 70 nm, or at least 100 nm.

Embodiment 12

The building assembly of any of the preceding embodiments, wherein the microporous particles have an average pore diameter of not greater than 100 microns, such as not greater than 80 microns, not greater than 60 microns, not greater than 30 microns, or not greater than 10 microns.

Embodiment 13

The building assembly of any of the preceding embodiments, wherein the microporous particles have an average pore volume of at least 0.05 $cm^3/g$, such as at least 0.1 $cm^3/g$, at least 0.3 $cm^3/g$, or at least 0.5 $cm^3/g$.

Embodiment 14

The building assembly of any of the preceding embodiments, wherein the microporous particles have an average pore volume of not greater than 2 $cm^3/g$, such as not greater than 1.5 $cm^3/g$, not greater than 1.0 $cm^3/g$, or not greater than 0.8 $cm^3/g$.

Embodiment 15

The building assembly of any of the preceding embodiments, wherein the microporous particles have an aspect ratio of length to width not greater than 5, such as not greater than 3, not greater than 2, or not greater than 1.5.

Embodiment 16

The building assembly of any of the preceding embodiments, wherein the microporous particles are spherical.

Embodiment 17

The building assembly of any of the preceding embodiments, wherein the thermoplastic polymer includes an ethylene vinyl acetate copolymer, a polyolefin, an ethylene methacrylate copolymer, an ethylene acrylic acid copolymer, a styrene block copolymer, a polyurethane, a polyamide, or any combination thereof.

Embodiment 18

The building assembly of any of the preceding embodiments, wherein an amount of the thermoplastic polymer is at least 10 wt %, such as at least 20 wt %, or at least 30 wt % based on the total weight of the coating film.

Embodiment 19

The building assembly of any of the preceding embodiments, wherein an amount of the at least one thermoplastic polymer is not greater than 70 wt %, such as not greater than 60 wt %, not greater than 50 wt %, or not greater than 45 wt % based on the total weight of the coating film.

Embodiment 20

The building assembly of any of the preceding embodiments, wherein the coating film further comprises a wax and a tackifying resin.

Embodiment 21

The building assembly of any of the preceding embodiments, wherein the coating film further comprises a cellulose ester.

Embodiment 22

The building assembly of embodiment 21, wherein the cellulose ester includes cellulose acetate, cellulose propionate, cellulose butyrate, cellulose acetate propionate, cellulose acetate butyrate, cellulose propionate butyrate, or any combination thereof.

Embodiment 23

The building assembly of embodiment 22, wherein the cellulose ester includes cellulose acetate propionate.

Embodiment 24

The building assembly of any of embodiments 20 to 23, wherein the wax of the coating film is present in an amount of at least 5 wt %, such as at least 7 wt %, or at least 10 wt % based on the total weight of the coating film.

Embodiment 25

The building assembly of any of embodiments 20 to 24, wherein the wax of the coating film is present in an amount of not greater than 40 wt %, such as not greater than 35 wt %, not greater than 30 wt %, or not greater than 25 wt % based on the total weight of the coating film.

Embodiment 26

The building assembly of any of embodiments 20 to 25, wherein the tackifying resin is present in an amount of at least 15 wt %, such as at least 20 wt %, or at least 25 wt % based on the total weight of the coating film.

Embodiment 27

The building assembly of any of embodiments 20 to 26, wherein the tackifying resin is present in an amount of not greater than 50 wt %, such as not greater than 45 wt %, or not greater than 40 wt % based on the total weight of the coating film.

Embodiment 28

The building assembly of any of the preceding embodiments, wherein the coating film further comprises a UV absorber, a light stabilizer, a filler, a dye, a dispersant or any combination thereof.

Embodiment 29

The building assembly of any of the preceding embodiments, wherein the coating film has a water vapor permeability of not greater than 100 US perms, such as not greater 50 US perms, or not greater than 20 US perms.

Embodiment 30

The building assembly of any of the preceding embodiments, wherein the coating has a water vapor permeability of at least 3 US perms, such as at least 5 US perms, at least 8 US perms, or at least 10 US perms.

Embodiment 31

The building assembly of any of the precedent embodiments, wherein the coating film comprises a non-curing hotmelt composition.

Embodiment 32

The building assembly of any of the preceding embodiments, wherein the coating film is a one-layer coating and the coating is in direct contact with at least one outer surface of the building substrate.

Embodiment 33

The building assembly of any of embodiments 1 to 31, wherein the coating film is a multi-layer coating.

Embodiment 34

The building assembly of any of the preceding embodiments, wherein the substrate is a board, a panel, or a siding.

Embodiment 35

The building assembly of embodiment 34, wherein the substrate is a board comprising gypsum.

Embodiment 36

The building assembly of any of embodiments 20 to 35, wherein the thermoplastic polymer is present in an amount of 20 wt % to 60 wt % based on the total weight of the coating film, the wax is present in an amount of 5 wt % to 40 wt % based on the total weight of the coating film; the tackifying resin is present in an amount of 15 wt % to 50 wt % based on the total weight of the coating film; and the microporous particles are present in an amount of 1 wt % to 30 wt % based on the total weight of the coating film.

Embodiment 37

The building assembly of embodiment 36, wherein the coating film further includes an UV absorbent in an amount of 0.1 wt % to 3 wt % based on the total weight of the coating film.

Embodiment 38

A method for making a building assembly, comprising: providing a substrate comprising a first surface and a second surface opposite to the first surface; preparing a water barrier coating film comprising a thermoplastic polymer and microporous particles; and applying the water barrier coating film on the first surface, the second surface, or the first surface and second surface of the substrate.

Embodiment 39

The method of embodiment 38, wherein preparing the water barrier coating film comprises in the following order: melting a coating composition, the coating composition comprising a thermoplastic polymer; applying a layer of the melted coating composition onto a removable liner; adding microporous particles on top of the layer of the melted coating composition, wherein a majority of the microporous particles is embedded into the melted coating composition; and allowing the melted coating composition to cool and to solidify to form a coating film, wherein the coating film has a water vapor permeability of at least 2 US perms, as tested according to ASTM E96 (2014) at 21° C. and 50% average relative humidity.

Embodiment 40

The method of embodiments 38 or 39, wherein applying the water barrier coating film to the substrate comprises softening the coating film by heating the coating film to a temperature between 70° C. to 110° C., and adhering the heated coating film on the first surface or the second surface of the substrate.

Embodiment 41

The method of any of embodiments 38 to 40, wherein the substrate is a board comprising gypsum.

Embodiment 42

The method of any of embodiments 38 to 41, wherein the microporous particles comprise microporous glass beads, microporous ceramic beads, microporous polymer beads, a naturally microporous material, or any combination thereof.

Embodiment 43

The method of embodiment 42, wherein the microporous particles are consisting essentially of microporous glass beads.

Embodiment 44

The method of any of embodiments 38 to 43, wherein the microporous particles have an average particle size of at least 25 microns and not greater than 1000 microns.

Embodiment 45

The method of any of embodiments 38 to 44, wherein a thickness of the layer of the melted coating composition is at least 50 microns and not greater than 1000 µm.

Embodiment 46

The method of embodiment 39, wherein a ratio $T_p$ to $T_m$ is equal to or greater than 1, with $T_p$ being an average size of the microporous particles before added to the coating composition, and $T_m$ being an average size of a thickness of the layer of the melted coating composition before adding of microporous particles.

Embodiment 47

The method of embodiment 46, wherein a ratio of $T_p$ to $T_m$ ranges from 1:1 to 3:1, such as from 1:1 to 2:1, from 1:1 to 1.8:1, or from 1:1 to 1.5:1.

Embodiment 48

The method of any of embodiments 38 to 47, wherein an amount of the microporous particles in the coating film is at least 1 vol %, such as at least 5 vol %, at least 10 vol %, at least 15 vol %, or at least 20 vol % based on the total volume of the coating film.

Embodiment 49

The method of any of embodiments 38 to 48, wherein an amount of the microporous particles in the coating film is not greater than 60 vol %, such as not greater than 55 vol %, not greater than 50 vol %, not greater than 40 vol %, or not greater than 30 vol % based on the total weight of the coating film.

Embodiment 50

The method of any of embodiments 38 to 49, wherein the microporous particles have an average pore diameter of at least 50 nm, such as at least 70 nm, or at least 100 nm.

Embodiment 51

The method of any of embodiments 38 to 50, wherein the microporous particles have an average pore diameter of not greater than 100 microns, such as not greater than 80 microns, not greater than 60 microns, not greater than 30 microns, or not greater than 10 microns.

Embodiment 52

The method of any of embodiments 38 to 51, wherein the microporous particles have an average pore volume of at least 0.05 cm$^3$/g, such as at least 0.1 cm$^3$/g, at least 0.3 cm$^3$/g, or at least 0.5 cm$^3$/g.

Embodiment 53

The method of any of embodiments 38 to 52, wherein the microporous particles have an average pore volume of not greater than 2 cm$^3$/g, such as not greater than 1.5 cm$^3$/g, not greater than 1.0 cm$^3$/g, or not greater than 0.8 cm$^3$/g.

Embodiment 54

The method of any of embodiments 38 to 53, wherein the microporous particles have an aspect ratio of length to width of not greater than 5, such as not greater than 3, not greater than 2, or not greater than 1.5.

Embodiment 55

The method of any of embodiments 38 to 53, wherein the microporous particles are spherical.

Embodiment 56

The method of any of embodiments 38 to 55, wherein the thermoplastic polymer includes an ethylene vinyl acetate copolymer, a polyolefin, an ethylene methacrylate copolymer, an ethylene acrylic acid copolymer, a styrene block copolymer, a polyurethane, a polyamide, or any combination thereof.

Embodiment 57

The method of any of embodiments 38 to 56, wherein an amount of the at least one thermoplastic polymer is at least 10 wt %, such as at least 20 wt %, at least 30 wt %, or at least 40 wt % based on the total weight of the coating film.

Embodiment 58

The method of any of embodiments 38 to 57, wherein an amount of the at least one thermoplastic polymer is not greater than 95 wt %, such as not greater than 90 wt %, or not greater than 80 wt % based on the total weight of the coating film.

Embodiment 59

The method of any of embodiments 38 to 58, wherein the coating film further comprises a wax and a tackifying resin.

Embodiment 60

The method of any of embodiments 38 to 59, wherein the coating film further comprises a cellulose ester.

Embodiment 61

The method of embodiment 60, wherein the cellulose ester includes cellulose acetate, cellulose propionate, cellulose butyrate, cellulose acetate propionate, cellulose acetate butyrate, cellulose propionate butyrate, or any combination thereof.

Embodiment 62

The method of embodiment 61, wherein the cellulose ester includes cellulose acetate propionate.

Embodiment 63

The method of any of embodiments 38 to 62, wherein the coating film has a water vapor permeability of not greater than 100 US perms, such as not greater 50 US perms, or not greater than 20 US perms.

Embodiment 64

The method of any of embodiments 38 to 63, wherein the coating film has a water vapor permeability of at least 3 US perms, such as at least 5 US perms, at least 8 US perms, or as at least 10 US perms.

Embodiment 65

The method of any of embodiments 38 to 64, wherein the coating composition is a non-curing hotmelt coating.

Embodiment 66

A water barrier coating film, comprising a thermoplastic polymer and microporous particles, the water barrier coating film having a water vapor permeability of at least 2 perms.

Embodiment 67

A water barrier coating film, comprising a thermoplastic polymer and microporous particles, wherein the microporous particles provide an interconnected porous structure throughout a thickness of the water barrier coating film, and the water barrier coating film has a water vapor permeability of at least 2 US perms as tested according to ASTM E96 (2014) at 21° C. and 50% average relative humidity.

EXAMPLES

The following non-limiting examples illustrate the concepts as described herein.

Example 1

An EVA based hotmelt (PA4441 from Applied Adhesives, Pewaukee, Wis.) was applied onto a PTFE liner with a thickness of approximately 127 microns (5 mils) and approximately 254 microns (10 mils). Immediately thereafter, while the hotmelt coatings were still fluid or semi-fluid, 0.5 g microporous glass beads (PORAVER™), which have been heated in an oven at 300° C., were sprinkled on top of the hotmelt coatings over a section of 10.16 cm (4 inches) by 10.16 cm (4 inches). Thereafter, the coatings with the sprinkled glass beads were covered by a further PTFE liner and medium pressure was applied by hand with a large metal bar (7 pounds weight) to press the glass beads into the hotmelt coatings. The experiments were conducted using two different fraction sizes of PORAVER™ glass beads: 40 microns to 125 microns and 250 microns to 500 microns:

After the hotmelt of the coatings was cooled and solidified, the PTFE liners were removed from the coatings to obtain independent coating films. The coating films were inspected for pinholes or defects and tested for water vapor permeability according to ASTM E96 at 21° C. and 50% relative humidity (RH).

Table 1 summarizes the results of the conducted experiments.

TABLE 1

| Sample | Thickness hot melt coating [microns] | Average size of glass beads [microns] | Amount of glass beads [vol %] | Water Vapor Permeability [US perms] |
|---|---|---|---|---|
| 1 | 127 (5 mils) | No glass beads |  | <1 |
| 2 | 254 (10 mils) | No glass beads |  | <1 |
| 3 | 127 (5 mils) | 40-125 | 53 | <1 |
| 4 | 254 (10 mils) | 40-125 | 35 | <1 |
| 5 | 254 (10 mils) | 250-500 | 35 | 8.4 |

Hotmelt coatings without microporous particles did not allow water vapor flow. Also, hotmelt coatings including microporous particles which were smaller then the thickness of the hotmelt coating layer (before adding the particles) did not result in coating films that can allow water vapor flow. Coating films that provided water vapor flow could be obtained if the microporous glass beads had a nearly equal or larger average particle size then the thickness of the layer of the melted coating composition (before adding the particles).

Example 2

Water barrier coating films were prepared and tested the same way as in Example 1, except that the microporous glass beads were mixed into the fluid hotmelt before applying the hot-melt coatings onto the liner. In addition to the size of the glass beads, also the amount of glass beads was varied, as summarized in Table 2.

Independent of the type and the amount of porous glass beads, no bridging effect could be achieved to obtain a water vapor flow through the coating films. An explanation can be that the hotmelt clogged the pores of the beads during mixing the beads with the hotmelt.

TABLE 2

| Thickness of hot melt coating [microns] | Average size of glass beads [microns] | Amount of glass beads [vol %] | Water Vapor Permeability [US perms] |
|---|---|---|---|
| 635 (25 mils) | 100-300 | 20 | <1 |
| 127 (5 mils) | 40-125 | 10 | <1 |
| 127 (5 mils) | 40-125 | 20 | <1 |
| 127 (5 mils) | 40-125 | 35 | <1 |

Figure 4:
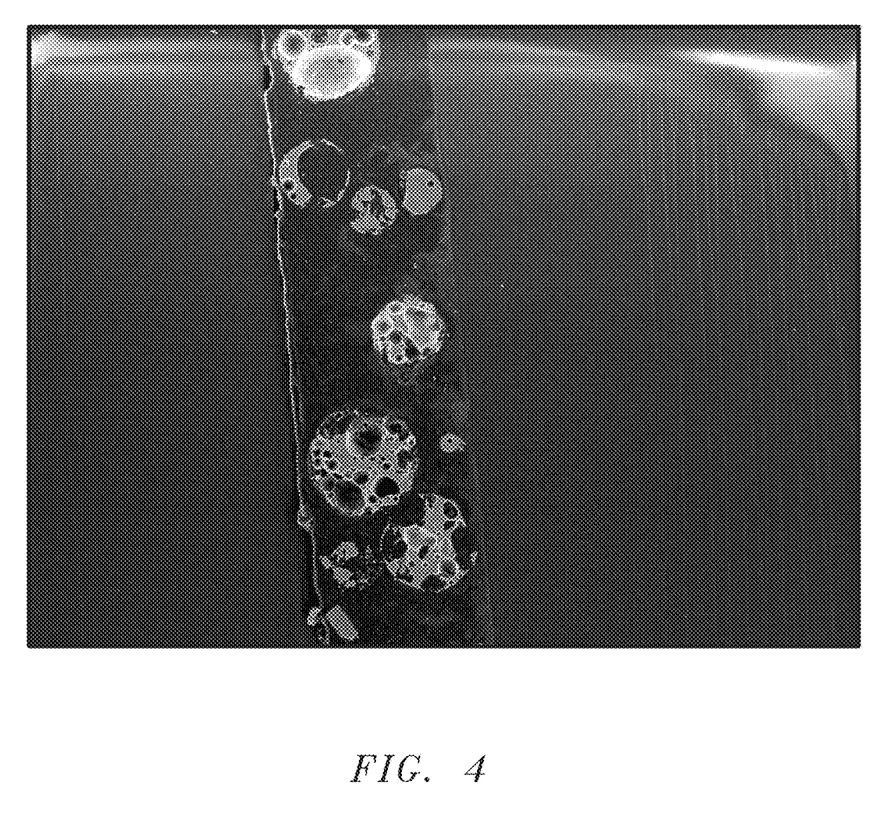
FIG. 4 includes an SEM image of a water barrier coating film which is closed and does not allow water vapor flow through the coating film.

FIG. 4 illustrates an example of a coating film wherein no water vapor could penetrate the film. The microporous beads are not forming a bridging system and are too isolated within the coating composition.

Example 3

A lamination process was developed to adhere the hotmelt coating films containing the PORAVER™ beads produced in Example 1 to the surface of a gypsum board without directly coating the board.

Figure 5:
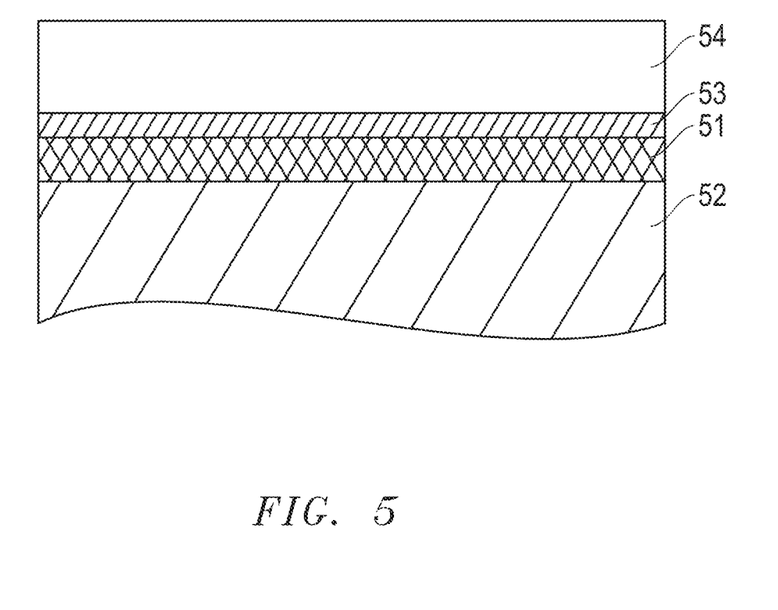
FIG. 5 includes an illustration of a building assembly at a stage of a lamination process according to one embodiment.

As illustrated in FIG. 5, the coating film 51 was placed on the gypsum board 52. The coating film 51 was covered with a PTFE liner 53, and a hotplate 54 heated to a temperature between 100° C. to 110° C. was placed under light pressure on the outer surface of the liner 53 for a period of 30 seconds to 120 seconds (depending on the film properties). In order to adhere the coating film 51 to the gypsum board 52, the hotmelt was heated until it softened but before melting the hotmelt. After allowing the coating film to cool for about three minutes, the liner 53 was carefully removed from the coating film 51.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A building assembly comprising a substrate and a water barrier coating film, wherein
the substrate comprises a first surface and a second surface opposite to the first surface, and the coating film overlies the first surface, the second surface, or the first surface and the second surface of the substrate;
the coating film comprises a thermoplastic polymer and microporous particles, the microporous particles having an average particle size of at least 250 microns;
the average particle size of the microporous particles contained in the coating film is at least equal to a thickness of the coating film at positions which do not contain microporous particles; and
the coating film has a water vapor permeability of at least 2 US perms as tested according to ASTM E96 (2014) at 21° C. and 50% average relative humidity.

2. The building assembly of claim 1, wherein the microporous particles comprise microporous glass beads, microporous ceramic beads, microporous polymer beads, a naturally microporous material, or any combination thereof.

3. The building assembly of claim 2, wherein the microporous particles are consisting essentially of microporous glass beads.

4. The building assembly of claim 1, wherein the microporous particles have an average particles size of at least 250 microns and not greater than 1000 microns.

5. The building assembly of claim 1, wherein the coating film has a thickness of at least 25 microns and not greater than 1000 microns.

6. The building assembly of claim 1, wherein an amount of the microporous particles in the coating film is at least 10 vol % and not greater than 60 vol % based on the total volume of the coating film.

7. The building assembly of claim 1, wherein the thermoplastic polymer includes an ethylene vinyl acetate copolymer, a polyolefin, an ethylene methacrylate copolymer, an ethylene acrylic acid copolymer, a styrene block copolymer, a polyurethane, a polyamide, or any combination thereof.

8. The building assembly of claim 1, wherein an amount of the thermoplastic polymer is at least 10 wt % based on the total weight of the coating film.

9. The building assembly of claim 1, wherein the coating film further comprises a wax and a tackifying resin.

10. The building assembly of claim 1, wherein the coating film further comprises a cellulose ester.

11. The building assembly of claim 1, wherein the coating film has a water vapor permeability of at least 3 US perms and not greater than 100 US perms.

12. The building assembly of claim 1, wherein the coating film comprises a non-curing hotmelt composition.

13. The building assembly of claim 1, wherein the substrate is a board comprising gypsum.

14. A method for making a building assembly, comprising:
providing a substrate comprising a first surface and a second surface opposite to the first surface;
preparing a water barrier coating film comprising a thermoplastic polymer and microporous particles, the microporous particles having an average particle size of at least 250 microns; and
applying the water barrier coating film on the first surface, the second surface, or the first surface and second surface of the substrate,
wherein the average particle size of the microporous particles contained in the coating film is at least equal to a thickness of the coating film at positions which do not contain microporous particles.

15. The method of claim 14, wherein preparing the water barrier coating film comprises in the following order:
melting a coating composition, the coating composition comprising a thermoplastic polymer;
applying a layer of the melted coating composition onto a removable liner;
adding microporous particles on top of the layer of the melted coating composition, wherein a majority of the microporous particles is embedded into the melted coating composition; and
allowing the melted coating composition to cool and to solidify to form the water barrier coating film,
wherein the water barrier coating film has a water vapor permeability of at least 2 US perms as tested according to ASTM E96 (2014) at 21° C. and 50% average relative humidity.

16. The method of claim 15, wherein applying the water barrier coating film to the substrate comprises softening the coating film by heating the coating film to a temperature between 70° C. to 110° C., and adhering the heated coating film on the first surface or the second surface of the substrate.

17. The method of claim 15, wherein a ratio of $T_p$ to $T_m$ is equal to or greater than 1, with $T_p$ being an average size of the microporous particles before added to the coating composition, and $T_m$ being an average size of a thickness of the layer of the melted coating composition before adding of microporous particles.

18. The method of claim 14, wherein the microporous particles comprise microporous glass beads, microporous ceramic beads, microporous polymer beads, a naturally microporous material, or any combination thereof.

19. A water barrier coating film, comprising a thermoplastic polymer and microporous particles, the water barrier coating film having a water vapor permeability of at least 2 US perms as tested according to ASTM E96 (2014) at 21° C. and 50% average relative humidity, wherein the microporous particles have an average particle size of at least 250 microns, and the average particle size of the microporous particles contained in the coating film is at least equal to a thickness of the coating film at positions which do not contain microporous particles.

* * * * *